Figure 3:
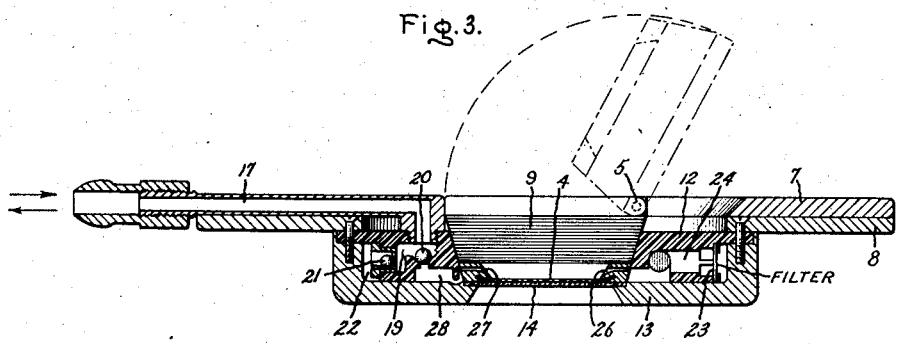

June 16, 1959 C. G. SUITS 2,890,621
PHOTOGRAPHIC PRINTING METHOD AND APPARATUS
Filed Sept. 24, 1954 2 Sheets-Sheet 1
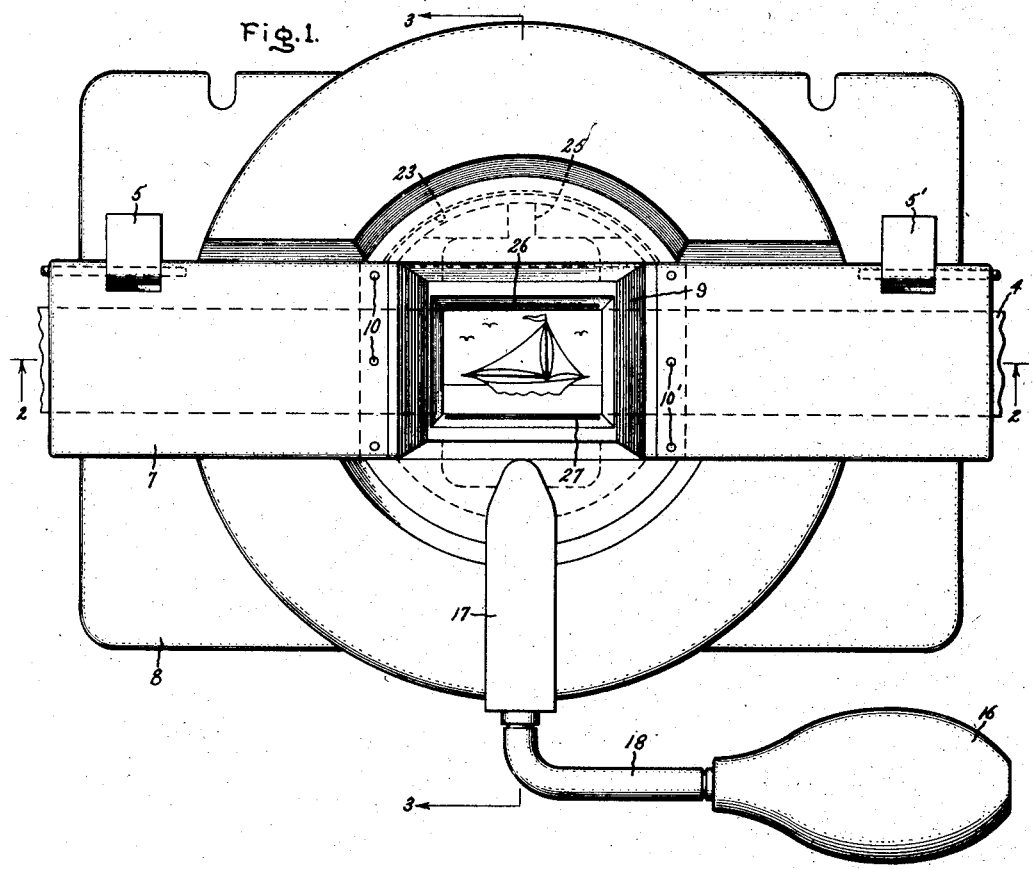
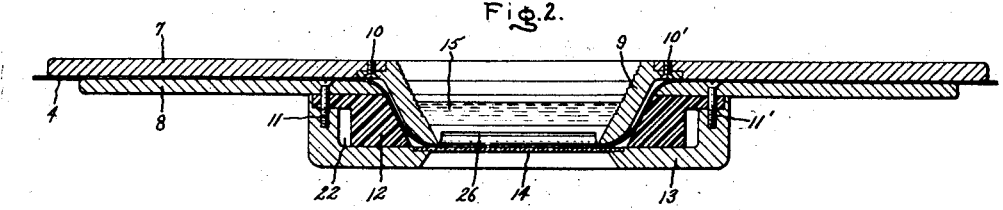
Inventor:
Chauncey G. Suits,
by Paul A. Frank
His Attorney.

June 16, 1959  C. G. SUITS  2,890,621
PHOTOGRAPHIC PRINTING METHOD AND APPARATUS
Filed Sept. 24, 1954  2 Sheets-Sheet 2

Inventor:
Chauncey G. Suits,
by Paul A. Frank
His Attorney.

United States Patent Office 2,890,621
Patented June 16, 1959

---

2,890,621

PHOTOGRAPHIC PRINTING METHOD AND APPARATUS

Chauncey G. Suits, Schenectady, N.Y., assignor to General Electric Company, a corporation of New York Application September 24, 1954, Serial No. 458,233

12 Claims. (Cl. 88—24)

This application is a continuation-in-part of my application Serial No. 256,328, now abandoned filed November 14, 1951, and assigned to the same assignee as the present invention.

The present invention relates to picture projection from photographic films either for visual purposes or for the preparation of enlargements. Its object is to reduce substantially, or eliminate entirely, the magnification in the enlarged picture or photographic print of imperfections, such as scratches, dust, or dirt, which may appear on a photographic negative.

Heretofore, the reduction of defects has been only approximately by illuminating the film through a light-diffusing screen, whereby the defects, such as scratches, were made less noticeable but unfortunately also the sharpness and contrast of the photographic print was reduced. Dust may be minimized by unusual provisions for filtering the air of a room in which projections are made and otherwise providing air as clean as possible but dust still remains a source of defects. It appears to be attracted by electric charges on photographic films. As a result of my present invention, which includes an improved photographic projection holder for negatives, the effect of dust and scratches on photographic negatives is avoided.

Enlarged projections of unimpaired clarity and detail are obtained as a consequence of my invention when projecting light through a photographic negative, which unavoidably is marred more or less by scratches or other surface imperfections, by maintaining the negative immersed in or wetted at such time by a particular class of clear, colorless, transparent liquids of low viscosity which have a refractive index approximating the refractive index of the film base and emulsion of the negative.

I have discovered that liquid methylpolysiloxanes, such as the polydimethylsiloxanes and the linear methylpolysiloxanes, may be employed advantageously in the method and apparatus of my invention. I have also discovered that methylphenylpolysiloxanes may be employed to advantage in the practice of my invention when unusually deep scratches are present in a photographic negative which is to be enlarged.

One example of a useful liquid methylpolysiloxane is constituted by liquid silicone compounds known as polydimethylsiloxanes which have the general ring formula $[(CH_3)_2SiO]_x$, $x$ being an integer greater than 3. In the case of mixtures of compounds of this type constituting the immersion liquid, $x$ may be 3. Another example is a range of liquid linear methylpolysiloxanes having the general formula $CH_3[(CH_3)_2SiO]_ySi(CH_3)_3$, $y$ being equal to or greater than 1. Mixtures of such compounds may be used. Compounds in which $y$ is equal to 1 to 6, inclusive, are recommended for use. Another example of a type of transparent liquids of low viscosity and required optical and other physical properties is the class of siloxanes containing the group characterized by the formula

As a specific example of a particular compound of this class, reference is made to 3-trimethylsiloxyheptamethyltrisiloxane.

A particularly useful bathing liquid consists of the liquid silicone compound which may be represented by the formula $[(CH_3)_2SiO]_4$. The preparation of this compound is described in an article by Patnode and Wilcox, J. Am. Chem. Soc. 68, p. 358 (1946). This liquid silicone compound has the required low viscosity and desired optical properties and sufficient volatility to be capable of being readily evaporated from a negative when it has been removed therefrom, without being too highly volatile to be readily handled.

Among the methylphenylpolysiloxanes useful in the present invention are relatively low molecular weight, low viscosity, low boiling compounds such as phenylpentamethyldisiloxane having the formula $(C_6H_5)(CH_3)_2SiOSi(CH_3)_3$ 1,1-diphenyltetramethyldisiloxane having the formula $(C_6H_5)_2(CH_3)SiOSi(CH_3)_3$, 1,3-diphenyltetramethyldisiloxane having the formula $(C_6H_5)(CH_3)_2SiOSi(CH_3)_2(C_6H_5)$ etc. These materials can be described as disiloxanes having from 1 to 2 phenyl radicals attached to silicon with the remainder of the valences of silicon other than the valences which make up the siloxane chain being satisfied by methyl radicals.

The silicone compounds which have been given as examples are non-aqueous, also non-toxic to handle and to breathe and are practically odorless. They are inert with respect to the film base and the components of the photographic emulsion. Their refractive indices are sufficiently close to the refractive index of the ordinary negative to so completely cover scratches on the film that they do not appear in the projected image. In general, the refractive index of the bathing liquid should be within the limits of about 1.35 to 1.70.

My invention includes a negative carrier or holder for photographic projection in which the chosen liquid bathes the film from which projections are to be made and which is provided with means maintaining such liquid free from dust and suspended particles.

Figure 4:
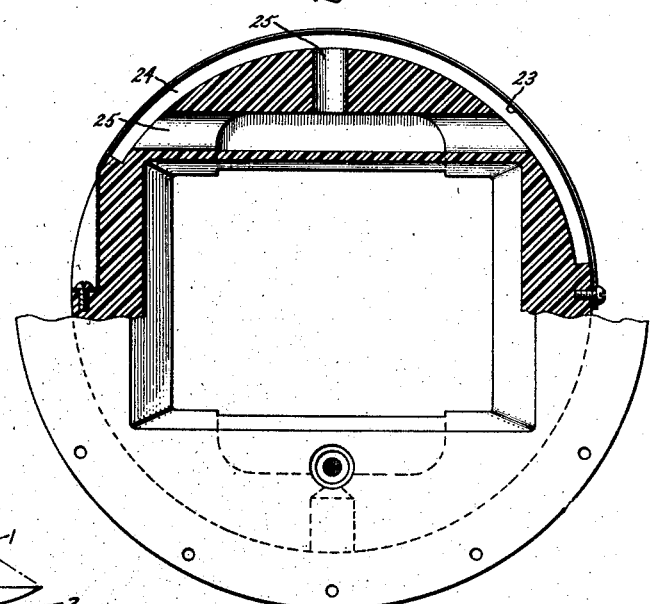

In the accompanying drawings Fig. 1 is a top or plan view of a film holder embodying my invention; Fig. 2 is a sectional view taken as indicated by lines 2—2 of Fig. 1; Fig. 3 is a section on lines 3—3 of Fig. 1; Fig. 4 is a detail plan view of a dished filter manifold through which the film bathing liquid is circulated; and Fig. 5 is a diagrammatic view of the entire photographic enlarger in its relation to an original film and an enlarged print.

Figure 5:
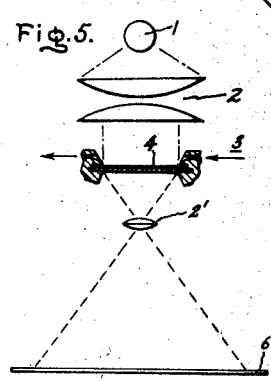

Referring first to Fig. 5, the main elements of the photographic projector in its entirety comprises a light source 1, a condensing lens 2, a film holder and screen 3, in which a photographic negative 4 has been indicated, and an enlarging lens 2'. A means 6 has been diagrammatically indicated for receiving the enlarged image for printing or viewing as the case may be. The means 6 may be the photographic printing paper on which an enlargement is to be made. A supporting frame has not been shown.

A diffusing screen of ground or opal glass between the source of light and the negative will to some extent minimize the effect of scratches on the negative which otherwise would be sharply imaged on the enlargement but a diffusing screen has a number of undesirable drawbacks. In addition to undesirably reducing the light intensity by a substantial factor, it also decreases the sharpness of detail in the enlargment which is being made. Also, it has the effect of degrading the contrast in the photographic enlargement. When the diffusion screen is removed from the enlarging apparatus, higher illumination, improved sharpness, and better contrast are achieved but the practical problem remains of dealing with film scratches, also superficial dirt and dust particles.

It has been suggested to overcome these difficulties by placing a photographic negative which is to be enlarged between two sheets of plain glass, together with an intermediate film of glycerin. The glycerin was intended to fill the scratches and thus to obliterate them in the projected enlargement. However, it was found impracticable to avoid the inclusion of small air bubbles and minute suspended foreign particles in the viscous glycerin. For this reason and also because of the difficulty of finally removing glycerin from the film and because of the fact that glycerin tends to swell the film base, utilization of glycerin for coating films during projection did not come into use.

Many other liquids have also been tried in projection systems to eliminate the effect of dust and scratches, but all of these materials have been eliminated for one or more reasons. For example, water has been tried and eliminated because it tends to soften the film and make it subject to scratches. Carbon tetrachloride has been eliminated because it is highly toxic and thus cannot be used in the confines of a darkroom. Many organic liquids including hydrocarbons such as n-hexadecane (cetane), and isooctane, and alcohols such as n-decanol and 2-ethylhexanol have also been tried and eliminated as practical materials. In the case of these organic liquids the toxic hazard involved in their use in the confines of a darkroom made them impractical.

The silicone materials employed in my invention eliminate the difficulties encountered with prior art materials. These silicone materials are completely colorless, odorless, and non-toxic. They have a refractive index sufficiently close to that of film components that they eliminate the effect of scratches when projecting an enlarged image. They exhibit a type of detergent action so that dust particles and fingerprints may be removed from the surfaces of a film by merely flowing them over the surfaces of the film. They have a relatively low viscosity so that they flow readily over the surface of the film and off the film when the film is removed from the projection apparatus. They are sufficiently volatile that any excess material left on the film evaporates readily after removal of the film from the body of the material. Finally, the silicone materials employed in the practice of the present invention have no detrimental effect whatsoever on the film material, i.e., there is no tendency for the film to swell or for the emulsion to float off the film base.

I shall now describe an apparatus whereby during picture projection a photographic film is maintained bathed in a mobile liquid of low viscosity which has the required optical properties. My improved projection apparatus is provided with means for maintaining the film-bathing liquid free from air bubbles and free from dust particles or other suspended matter which would interfere with a faithful reproduction of the picture to be projected.

As shown in Figs. 1 and 2, the photographic negative or film 4 is held in a somewhat depressed position in a dished holder, one part of which is rotatably supported on the hinges 5, 5 as best seen in Fig. 3. The photographic negative 4 is held between the metal plates 7 and 8 (Fig. 2) and passes under an apertured frame member 9, the sides of which are scored to avoid undesired reflections. The frame 9 is attached to the plate 7 by screws 10, 10' as indicated. The plate 8 is attached by screws 11, 11' to a manifold 12 and also attaches the manifold to an apertured base member 13. The manifold 12 and the base 13 may consist of any suitable material, for example, of metal or of a plastic. The bottom of the film chamber is closed by a transparent plate or window 14 which may consist of glass.

The film-bathing mobile liquid 15 is introduced from a supply reservoir, which here is shown as a bulb 16 but which may assume the form of any means for applying the liquid under positive or negative pressure. The source 16, which may be a motor-operated pump, is connected to the manifold inlet 17 by a tube 18.

As best shown in Figs. 3 and 4, the inlet conduit 17 communicates with a passage 19 in the manifold 12. This passage 19 is provided with two ball valves 20 and 21. When the bulb 16 is compressed, causing liquid under positive pressure to enter the conduit 17 (as indicated by the upper arrow), the ball valve 20 remains closed and the ball valve 21 is opened. Liquid is admitted into conduit 22 and seeps through a filter 23 into an arc-shaped conduit 24. The latter admits the filtered dust-free liquid to the film chamber by branch channels 25 and an elongated slit opening 26 (Fig. 1). The body of liquid 15 (Fig. 2) in the film-holding depression is freed from undesired suspended matter by the filter 23 which may consist of chamois or other suitable filtering medium. Air bubbles thus are not trapped by the filtered liquid and, in any event, the low viscosity of the liquid soon causes bubbles to be released. The purified liquid slowly washes over the film 4 which lies just above the bottom plate 14.

When pressure on the bulb 16 is released, the liquid pressure is reversed (as indicated by the lower arrow in Fig. 3) causing the ball valve 21 to close and the ball valve 20 to open. Liquid is abstracted from the film chamber through a second slit 27 through the conduits 28, 19, 17 and 18 to the reservoir 16. This flowing of liquid through the filter 23 and slowly washing over the film in the same direction under negative pressure as well as positive pressure may be repeated several times to insure perfect clarity of liquid.

As a result of this invention, scratches and similar imperfections appearing on a negative do not appear on prints, and prints many times as large as the negative are free from imperfections due to dust or dirt on the negative.

My invention also is applicable to the projection of images on a screen to be viewed. Scratches are eliminated and such desirable properties as illumination, clarity, contrast and sharpness of the projected image are maintained at optimum values.

What I claim as new and desire to secure by Letters Patent of the United States is:

1. The method of eliminating the effect of scratches on a photographic negative when projecting light therethrough for the production of enlarged images which comprises positioning said negative in a transparent liquid polysiloxane having a refractive index within the limits of about 1.35 to 1.70 and projecting light through said negative and said polysiloxane.

2. The method of claim 1 in which the transparent liquid polysiloxane is a member selected from the class consisting of methylpolysiloxanes and methylphenylpolysiloxanes.

3. The method of claim 1 in which the transparent liquid polysiloxane is a methylpolysiloxane.

4. The method of claim 1 in which said polysiloxane is a methylphenylpolysiloxane.

5. The method of removing dust and fingerprints from a photographic negative and eliminating the effect of scratches on said negative when projecting light therethrough for the production of enlarged images which comprises positioning said negative in a transparent liquid polysiloxane having a refractive index substantially equal to the refractive index of the negative, flowing said liquid in a given direction over the surface of said negative, filtering said liquid prior to passing it over the surface of said negative, and projecting light through said negative and said liquid.

6. The method of claim 5 in which the transparent liquid polysiloxane is a member selected from the class consisting of methylpolysiloxanes and methylphenylpolysiloxanes.

7. The method of claim 5 in which the transparent liquid polysiloxane is a methylpolysiloxane.

8. The method of claim 5 in which said polysiloxane is a methylphenylpolysiloxane.

9. Apparatus for eliminating the effect of dust and scratches on a photographic negative while carrying out image projection through said negative comprising a negative holder defining a liquid-tight cavity, said cavity having a transparent window therein, means for positioning a photographic negative adjacent said transparent window, an inlet slit along one edge of said window, an outlet slit along the opposite edge of said window, a liquid filter adjacent said inlet slit, and means for circulating a fluid through said cavity by way of said filter and said inlet and outlet slits and over said transparent window.

10. Apparatus for eliminating the effect of dust and scratches on a photographic negative while carrying out image projection through said negative comprising a negative carrier having a bottom wall and side walls defining a liquid-tight cavity, a transparent window in said bottom wall, means for positioning a photographic negative adjacent said transparent window, an inlet slit along one edge of said window, an outlet slit along the opposite edge of said window, a liquid filter adjacent said inlet slit, and means for circulating a fluid through said cavity by way of said filter and said inlet and outlet slits and over said transparent window.

11. Apparatus for eliminating the effect of dust and scratches on a photographic negative while carrying out image projection through said negative comprising a negative holder defining a liquid-tight cavity, said cavity having a transparent window therein, means for positioning a photographic negative adjacent said transparent window, an inlet slit along one edge of said window, an outlet slit along the opposite edge of said window, a liquid filter adjacent said inlet slit, a reservoir containing a fluid, and means for circulating said fluid from said reservoir through said cavity by way of said filter and said inlet and outlet slits and over said transparent window.

12. Apparatus for eliminating the effect of dust and scratches on a photographic negative while carrying out image projection through said negative comprising a negative holder defining a liquid-tight cavity, said cavity having a transparent window therein, means for positioning a photographic negative adjacent said transparent window, an inlet slit along one edge of said window, an outlet slit along the opposite edge of said window, a liquid filter adjacent said inlet slit, a reservoir containing a transparent liquid organopolysiloxane having an index of refraction of from 1.35 to 1.70, and means for circulating said fluid from said reservoir through said cavity by way of said filter and said inlet and outlet slits and over said transparent window.

References Cited in the file of this patent

UNITED STATES PATENTS

| | | |
|---|---|---|
| 1,427,750 | Lewis | Aug. 29, 1922 |
| 2,073,287 | Sandvik | Mar. 9, 1937 |
| 2,446,668 | Tuttle | Aug. 10, 1948 |

OTHER REFERENCES

"Society of Motion Picture Engineers Transactions," No. 5, May 3, 1926, pages 49–55.

"Selicone News," July 1950, an Automobile Polish, by Dow-Corning Corp., Midland, Michigan, copied in magazine "Business Week," of July 1950.